(12) United States Patent
Cook

(10) Patent No.: US 9,317,490 B2
(45) Date of Patent: Apr. 19, 2016

(54) SYSTEMS AND METHODS FOR 3-TIER TAG CONTAINER ARCHITECTURE

(71) Applicant: Tagman Inc., New York, NY (US)

(72) Inventor: Paul Cook, Bletchingley (GB)

(73) Assignee: Tagman Inc., New York, NY (US)

( * ) Notice: Subject to any disclaimer, the term of this patent is extended or adjusted under 35 U.S.C. 154(b) by 111 days.

(21) Appl. No.: 14/030,325

(22) Filed: Sep. 18, 2013

(65) Prior Publication Data

US 2014/0089782 A1    Mar. 27, 2014

Related U.S. Application Data

(60) Provisional application No. 61/703,153, filed on Sep. 19, 2012.

(51) Int. Cl.
*G06F 17/22* (2006.01)
*G06Q 30/02* (2012.01)
*G06F 17/30* (2006.01)

(52) U.S. Cl.
CPC ...... *G06F 17/2247* (2013.01); *G06F 17/30899* (2013.01); *G06Q 30/0241* (2013.01)

(58) Field of Classification Search
USPC ........................................................ 715/234
See application file for complete search history.

(56) References Cited

U.S. PATENT DOCUMENTS

| 6,078,956 | A | 6/2000 | Bryant et al. |
| 6,138,237 | A | 10/2000 | Ruben et al. |
| 6,487,604 | B1 | 11/2002 | Rochford et al. |
| 6,633,312 | B1 | 10/2003 | Rochford et al. |
| 6,654,803 | B1 | 11/2003 | Rochford et al. |
| 6,691,282 | B1 | 2/2004 | Rochford et al. |
| 7,389,343 | B2 | 6/2008 | Busch et al. |
| 7,584,435 | B2 | 9/2009 | Bailey et al. |
| 7,587,433 | B2 | 9/2009 | Peleg et al. |
| 7,620,948 | B1 | 11/2009 | Rowe et al. |

(Continued)

FOREIGN PATENT DOCUMENTS

| EP | 1094635 A2 | 4/2001 |
| EP | 1105790 A1 | 6/2001 |

(Continued)

OTHER PUBLICATIONS

Tealium, Tag Management Buyers' Guide Jun. 15, 2012 https://www.google.com/url?paf=&q=http://www.waafiles.org/awards/nominees/2013/Tealium_New%2520Technology_Supporting%2520Info.pdf&usg=AFQjCNHyEJYitsXKXCwXfVNZQD84YndS8Q.*

(Continued)

*Primary Examiner* — Breffni X Baggot
(74) *Attorney, Agent, or Firm* — Banner & Witcoff, Ltd.

(57) ABSTRACT

The present disclosure is directed to methods and systems for 3-tier tag container architecture. A browser may execute, responsive to loading a web page, a tag container in the web page. The tag container may include a configuration component, a template component and a rules component for managing a plurality of tags. The template component may provide a template for dynamically generating the tags during page loading. The tag container may apply the configuration component to assign a value to at least one parameter of a configuration of a tag. The tag may comprise an instance of the template. The template may include parameters with values specifying the configuration of an instance of a tag created from the template. The tag container may apply the rules component to modify a property of the tag. The property may determine a loading behavior of the tag on the web page.

20 Claims, 6 Drawing Sheets

(56) References Cited

U.S. PATENT DOCUMENTS

| | | | |
|---|---|---|---|
| 7,885,942 B2 | 2/2011 | Chand et al. | |
| 7,890,451 B2 | 2/2011 | Cancel et al. | |
| 7,941,394 B2 | 5/2011 | Error | |
| 8,140,963 B2 | 3/2012 | Watson | |
| 8,452,790 B1* | 5/2013 | Mianji | G06F 17/30722 707/758 |
| 8,713,424 B1 | 4/2014 | Kuhn et al. | |
| 2002/0124076 A1 | 9/2002 | Lindstrom-Tamer | |
| 2002/0133575 A1 | 9/2002 | Cidon et al. | |
| 2003/0097421 A1 | 5/2003 | Wille et al. | |
| 2003/0154442 A1 | 8/2003 | Papierniak | |
| 2004/0199605 A1 | 10/2004 | LaCroix et al. | |
| 2005/0065855 A1* | 3/2005 | Geller | G06Q 20/12 705/26.1 |
| 2005/0209863 A1 | 9/2005 | Presler-Marshall et al. | |
| 2007/0011304 A1 | 1/2007 | Error | |
| 2007/0016575 A1* | 1/2007 | Hurst-Hiller | G06F 17/30893 |
| 2007/0112856 A1 | 5/2007 | Schram et al. | |
| 2007/0244650 A1 | 10/2007 | Gauthier | |
| 2007/0288247 A1 | 12/2007 | Mackay | |
| 2007/0299743 A1 | 12/2007 | Staib et al. | |
| 2007/0299964 A1 | 12/2007 | Wong et al. | |
| 2008/0040473 A1 | 2/2008 | Larsson et al. | |
| 2008/0052278 A1 | 2/2008 | Zlotin et al. | |
| 2008/0059889 A1 | 3/2008 | Parker et al. | |
| 2008/0086454 A1 | 4/2008 | Bahadori et al. | |
| 2008/0183858 A1 | 7/2008 | Error | |
| 2008/0184116 A1 | 7/2008 | Error | |
| 2008/0189281 A1 | 8/2008 | Cancel et al. | |
| 2008/0201242 A1 | 8/2008 | Minnis et al. | |
| 2008/0201643 A1 | 8/2008 | Nagaitis et al. | |
| 2008/0215631 A1 | 9/2008 | Abraham et al. | |
| 2008/0228819 A1 | 9/2008 | Minnis et al. | |
| 2008/0270471 A1 | 10/2008 | Schon | |
| 2009/0024748 A1 | 1/2009 | Goldspink et al. | |
| 2009/0076899 A1 | 3/2009 | Gbodimowo | |
| 2009/0100139 A1 | 4/2009 | Purdy et al. | |
| 2009/0100154 A1 | 4/2009 | Stevenson et al. | |
| 2009/0112918 A1 | 4/2009 | Terrell | |
| 2009/0164884 A1* | 6/2009 | Watson | G06F 17/3089 715/234 |
| 2009/0177796 A1 | 7/2009 | Falk et al. | |
| 2009/0182718 A1 | 7/2009 | Waclawik et al. | |
| 2009/0193497 A1 | 7/2009 | Kikuchi et al. | |
| 2009/0204478 A1 | 8/2009 | Kaib et al. | |
| 2009/0248484 A1 | 10/2009 | Surendran et al. | |
| 2009/0287713 A1 | 11/2009 | Anderson et al. | |
| 2009/0292677 A1 | 11/2009 | Kim | |
| 2009/0327353 A1 | 12/2009 | Zhuge et al. | |
| 2009/0328069 A1 | 12/2009 | Lala | |
| 2010/0017384 A1 | 1/2010 | Marinescu | |
| 2010/0030894 A1 | 2/2010 | Cancel et al. | |
| 2010/0037177 A1 | 2/2010 | Golsorkhi | |
| 2010/0049627 A1 | 2/2010 | Geppert et al. | |
| 2010/0235494 A1 | 9/2010 | Sood et al. | |
| 2010/0235749 A1 | 9/2010 | Ratnakar | |
| 2010/0251128 A1 | 9/2010 | Cordasco | |
| 2010/0281389 A1 | 11/2010 | Hutchinson | |
| 2010/0318976 A1 | 12/2010 | Everly et al. | |
| 2010/0332962 A1 | 12/2010 | Hammer et al. | |
| 2011/0029899 A1* | 2/2011 | Fainberg | G06F 17/30902 715/760 |
| 2011/0035486 A1 | 2/2011 | Seolas et al. | |
| 2011/0185016 A1* | 7/2011 | Kandasamy | G06Q 30/02 709/203 |
| 2011/0302485 A1* | 12/2011 | D'Angelo | G06F 17/30905 715/234 |
| 2012/0030559 A1* | 2/2012 | Manion | G06F 8/61 715/234 |
| 2012/0072488 A1* | 3/2012 | Manion | G06F 17/3089 709/203 |
| 2012/0131431 A1* | 5/2012 | Watson | G06F 17/3089 715/208 |
| 2013/0073401 A1 | 3/2013 | Cook | |
| 2014/0089782 A1 | 3/2014 | Cook | |
| 2014/0137006 A1* | 5/2014 | Goodwin | G06F 17/30 715/760 |

FOREIGN PATENT DOCUMENTS

| | | |
|---|---|---|
| EP | 1108309 A1 | 6/2001 |
| EP | 1108312 A1 | 6/2001 |
| EP | 1145167 A2 | 10/2001 |
| EP | 1264261 A2 | 12/2002 |
| EP | 1997041 A1 | 12/2008 |
| EP | 2141614 A1 | 1/2010 |
| EP | 2199969 A1 | 6/2010 |
| GB | 2412805 A | 10/2005 |
| WO | 0079374 A1 | 12/2000 |
| WO | 0103023 A2 | 1/2001 |
| WO | 0103374 A1 | 1/2001 |
| WO | 0103378 A1 | 1/2001 |
| WO | 2008024706 A2 | 2/2008 |
| WO | 2008137522 A2 | 11/2008 |
| WO | 2010119379 A1 | 10/2010 |
| WO | 2011084843 A1 | 7/2011 |

OTHER PUBLICATIONS http://tealium.com/blog/tag/universal-tag/page/2/ (May 24, 2010).*
European Search Report dated Jun. 2, 2014, Application No./Patent No. 10842752.7-1954/2524317 PCT/US2010061997, 9 pages.
2009 Seventh Annual Communication Networks and Services Research Conference, "Workload Characterization of a Large Systems Conference Seb Server", Aniket Mahanti, et al., © 2009 IEEE, pp. 55 through 64.
PCT International Search Report mailed Sep. 18, 2014, International Application No. PCT/US 14/28930, 11 pages.
Final Office Action for U.S. Appl. No. 13/305,282, filed Aug. 27, 2012, 19 pages.
Non-Final Office Action mailed Mar. 14, 2012, U.S. Appl. No. 13/305,282, 24 pages.
Wikipedia, the free encyclopedia webpage http;//en.wikipedia.org/wiki/List_of_HTTP_header_fields#Reqeusts, Aug. 11, 2011, 7 pp Wikimedia Foundation Inc.
Chenghsien Yu, et al. "A Study of Using Automatic Text Indexing to Analyze Web Browsing Behavior" Proceedings of the 5" World Congress on Intelligent Control and Automations, Jun. 15-19, 2004, Hangzhou, P.R. China.
Yong Tan, et al. "Analysis of a least recently used cache management policy for web browsers" Operations Research, v. 50, n 2, p. 345-57, Jan. 1999.
Christian von der Weth, et al.,"COBS: Realizing Decentralized Infrastructure for Collaborative Browsing and Search", 2011 Internationl Conference on Advanced Information Networking and Applications, (AINA 2011), p. 617-24, 2011, Mar. 22-25, 2011.
Hui Chen, et al., "Business-to-Consumer Mobile Agent-Based Internet Commerce System (MAGICS)", IEEE Transactions on Systems, Man, and Cybernetics—Part C: Applications and Reviews, vol. 37, No. 6, pp. 1174-1189, Nov. 1, 2007.
W. Ulam, et al. "Technical considerations in remote LIMS access via the World Wide Web", J Autom, Methods Manag. Chem. (UK); v 2005, n 4, pp. 217-222, Dec. 11, 2005.
Victor Pascual-Cid, "An Information Visualisation System for the Understand of Web Data", VAST'08—IEEE Symposium on Visual Analytics Science and Technology, Proceedings, p. 183-184, Oct. 21, 2008.
Alison Lee, et al. "Browsers to Support Awareness and Social Interaction", IEEE Computer Graphics and Applications, v 24, n 5, p. 66-75, Sep. 1, 2004.
Peterson, Eric T., "The Coming Revolution in Web Analytics," copyright 2009, pp. 1-18, SAS Institute Inc.
Manion, Josh, "Data Collection Part 1—Single Methodologies," retrieved Nov. 6, 2009, pp. 1-3, Stratigent, LLC.
Resig, John. Website: www.ejohn.org, retrieved Feb. 18, 2010.
Website: www.tealium.com, retrieved Jan. 26, 2010.
Website: www.monetate.com, retrieved Feb. 22, 2010.
Website: www.speed-trap.com, retrieved Jan. 26, 2010.

(56) References Cited

OTHER PUBLICATIONS

Website: www.tagman.com, retrieved Jan. 26, 2010.
Website: www.sitetagger.co.uk, retrieved Jan. 26, 2010.
Crockford, Douglas, "The JavaScript Minifier," Dec. 4, 2003, pp. 1-2, website: http://www.crockford.com/javascript/jsmin.html.
Crockford, Douglas, "PHP Adaptation of JSMin" JSMIN_lib.pho (for PHP 4, 5), retrieved on Jan. 26, 2010, pp. 1-10, website: http://javascript.crockford.com/jsmin2.php.txt.
Website: http://developer.yahoo.com/yui/, on Feb. 18, 2010, pp. 1-2.
Website: www.dojotoolkit.org, retrieved Feb. 22, 2010, p. 1.
Website: http://download.dojotoolkit.org/release-1.4.0/dojo.js.uncompressed.js, © 2004-2009.
Website: www.code.google.com/p/jqueryjs/downloads/detail?name=jquery-1.3.2.js, retrieved Jan. 26, 2010.
Website: www.jquery.com, retrieved Jan. 26, 2010, pp. 1-2.
Website: www.magiq.com, retrieved Feb. 22, 2010, pp. 1.
International Search Report & Written Opinion from PCT Application No. PCT/US10/61997, mailed Mar. 3, 2011.
Final Office Action mailed Sep. 6, 2012, U.S. Appl. No. 12/685,268, filed Jan. 11, 2010, 21 pages.
PCT International Search Report mailed Sep. 18, 2014, PCT/US 14/28930, 11 pages.
European Search Report, Application No./Patent No. 11853671.3-1870 / 2659367 PCT/US2011067870, mailed Nov. 3, 2014, 7 pages.
Phu H Phung et al, "Lightweight self-protecting JavaScript", Mar. 10-12, 2009 Sydney, Australia, © 2009 ACM, pp. 47-60.
Final Rejection issued Nov. 5, 2014 for U.S. Appl. No. 13/623,025.
Non-Final Office Action mailed Mar. 14, 2012, U.S. Appl. No. 12/685,268, filed Jan. 11, 2010, 32 pages.
http://blog.intlock.com/my-google-tag-manager-wishlist/#more-1113.
http://tealium.com/blog/tag/universal-tag/page/2/.
Tag Failed to Load (NPL: http://stackoverflow.com/questions/538745/how-to-tell-if-a-script-tag-failed-to-load).
Apr. 8, 2015—(US) Non-Final Office Action—U.S. Appl. No. 13/843,849, 50 pages.
Jun. 8, 2015—(US) Notice of Allowance—U.S. Appl. No. 13/623,025.

* cited by examiner

SYSTEMS AND METHODS FOR 3-TIER TAG CONTAINER ARCHITECTURE

RELATED APPLICATIONS

This application claims priority to U.S. Provisional Application No. 61/703,153, entitled "SYSTEMS AND METHODS FOR 3-TIER TAG CONTAINER ARCHITECTURE", filed Sep. 19, 2012, which is hereby incorporated by reference in its entirety for all purposes.

FIELD OF THE DISCLOSURE

This disclosure generally relates to systems and methods for online marketing and advertising. In particular, this disclosure relates to systems and methods for providing a 3-tiered tag container that can be incorporated onto a site page.

BACKGROUND OF THE DISCLOSURE

Online publishers or website owners typically offer opportunities for online advertising or marketing through their web pages. Web pages may use various types of advertising or marketing tags, which may comprise HTML or Javascript code, to load advertisements for display to a user. These tags can track online user activity, and may be activated at any time during a web page load. Online publishers or website owners may work with various partners which provide tags of various types and for various purposes. As the number of tags increases, delayed loading and processing of a page may result, due to the time for loading a plurality of tags on a page. This may significantly impact user experience, and may degrade the effectiveness of online advertising or marketing efforts. Moreover, online publishers or website owners can face a number of other issues with managing the tags of various types and purposes, including those related to management of obsoleted tags, supporting tags with new or changing features, and/or improving efficiency in managing larger numbers of tags which may be of different types.

BRIEF SUMMARY OF THE DISCLOSURE

In various aspects, the present application is directed to methods and systems for a 3-tier Tag Container Architecture. Traditional tag management systems and tag features may not be flexible, scalable and/or efficient when used in conjunction with a plurality of tags and/or tag types incorporated onto site pages. Various embodiments of the present methods and systems may provide a tag container architecture that can be used to replace and/or manage a plurality of tags and/or tag types. Upon incorporation onto a page, a tag container may provide rule customization (e.g., for one or more tags), and may do so without modifying web page or tag container hooking code on the web page.

The tag container architecture may include three components or tiers: (1) a configuration component (hereafter sometimes referred to as "config"), which may provide parameters that indicate how a tag may integrate to a page, (2) a template component, which may include default or recommended tag properties, and (3) a rules or transformers component, which may be used to modify tag properties for various purposes. This architecture may allow rule customization, and may allow a tag management system to scale up in support of more and/or new tags, which may be from various vendors and/or of various types. In certain embodiments, the tag container may determine the context of each page load and may selectively activate/fire certain tags that the tag container manages. In doing so, the tag container may reduce page loading delays, e.g., due to the loading of a number of Iframes initiated by a plurality of disparate tags. The tag container(s) (e.g., in communication with a tag management system server) may track user behavior and may provide real time attribution to affiliates and/or partners of the website, e.g., responsive to a conversion.

In one aspect, the present disclosure is directed to a method for managing a plurality of tags in a web page using a tag container. The method may include executing, by a browser of a client responsive to loading a web page on the browser, a tag container incorporated into the web page. The tag container may include a configuration component, a template component and a rules component for managing a plurality of tags. The template component may provide at least one template for dynamically generating the plurality of tags during loading of the web page. The tag container may apply, responsive to the execution, the configuration component to assign a value to at least one parameter of a configuration of a first tag of the plurality of tags. The first tag may comprise an instance of a first template of the at least one template. The first template may include a plurality of parameters with values specifying the configuration of an instance of a tag created from the first template. The tag container may apply the rules component to modify at least one property of the first tag. The at least one property may determine a loading behavior of the first tag on the web page. The web browser may load the first tag based on the loading behavior.

In some embodiments, the tag container may access, during execution, a server for at least one of: the configuration component, the template component and the rules component. The tag container may identify the first tag from the plurality of tags to generate, based on a context of the loading of the web page. The tag container may determine not to load a second tag from the plurality of tags based on a context of the loading of the web page. The tag container may via the template component, the first template for generating the first tag. The tag container may dynamically generate, during the loading of the web page, the plurality of tags as instances of the at least one template, may configure the instances with one or more parameter values assigned via the configuration component, and may modify at least one property of the instances using one or more rules provided via the rules component.

In some embodiments, the configuration component may assigning the value to the at least one parameter to the instance of the first template corresponding to the first tag. The at least one parameter may be for specifying one or more of: a location of a tag in the web page, synchronous or asynchronous loading of a tag, user-specific information, domain or web page information, campaign information, account information, identification of a tag, and session information. The rules component may incorporate business rules corresponding to at least one of a vendor, a partner and a campaign, into the instance of the first template corresponding to the first tag. The tag container may write the first tag into an iframe within the web page for loading. The tag container may determine a sequence for loading at least a subset of the plurality of tags.

In one aspect, the present disclosure is directed to a system for managing a plurality of tags in a web page using a tag container. The system may include a tag container incorporated into a web page loaded by a browser executing on a client. The tag container may include a configuration component, a template component and a rules component for managing a plurality of tags. The template component may provide at least one template for dynamically generating the plurality of tags during loading of the web page. The tag container may be executed by the browser responsive to loading the web page on the browser. The tag container may apply, responsive to the execution, the configuration component to assign at least one parameter value to a first tag of the plurality of tags. The first tag may comprise an instance of a first template of the at least one template. The first template may include a plurality of parameters with default values determining a manner by which the first tag integrates with the web page. The tag container may apply the rules component to modify at least one property of the first tag. The at least one property may determine a loading behavior of the first tag on the web page, wherein the web browser loads the first tag based on the modified properties.

In some embodiments, the tag container accesses, during execution, a server for at least one of: the configuration component, the template component and the rules component. The tag container may identify the first tag from the plurality of tags to generate, based on a context of the loading of the web page. The tag container may determine not to load a second tag from the plurality of tags based on a context of the loading of the web page. The tag container may identify via the template component, the first template for generating the first tag. The tag container may assign via the configuration component the value to the at least one parameter to the instance of the first template corresponding to the first tag, the at least one parameter for specifying one or more of: a location of a tag in the web page, synchronous or asynchronous loading of a tag, user-specific information, domain or web page information, campaign information, account information, identification of a tag, and session information.

In some embodiments, the tag container dynamically generates, during the loading of the web page, the plurality of tags as instances of the at least one template, configures the instances with one or more parameter values assigned via the configuration component, and modifies at least one property of the instances using one or more rules provided via the rules component. The rules component may incorporate business rules corresponding to at least one of a vendor, a partner and a campaign, into the instance of the first template corresponding to the first tag. The tag container may write the first tag into an iframe within the web page for loading. The tag container may determine a sequence for loading at least a subset of the plurality of tags.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for a 3-tier Tag Container Architecture.

A. Computing and Network Environment

Figure 1A:
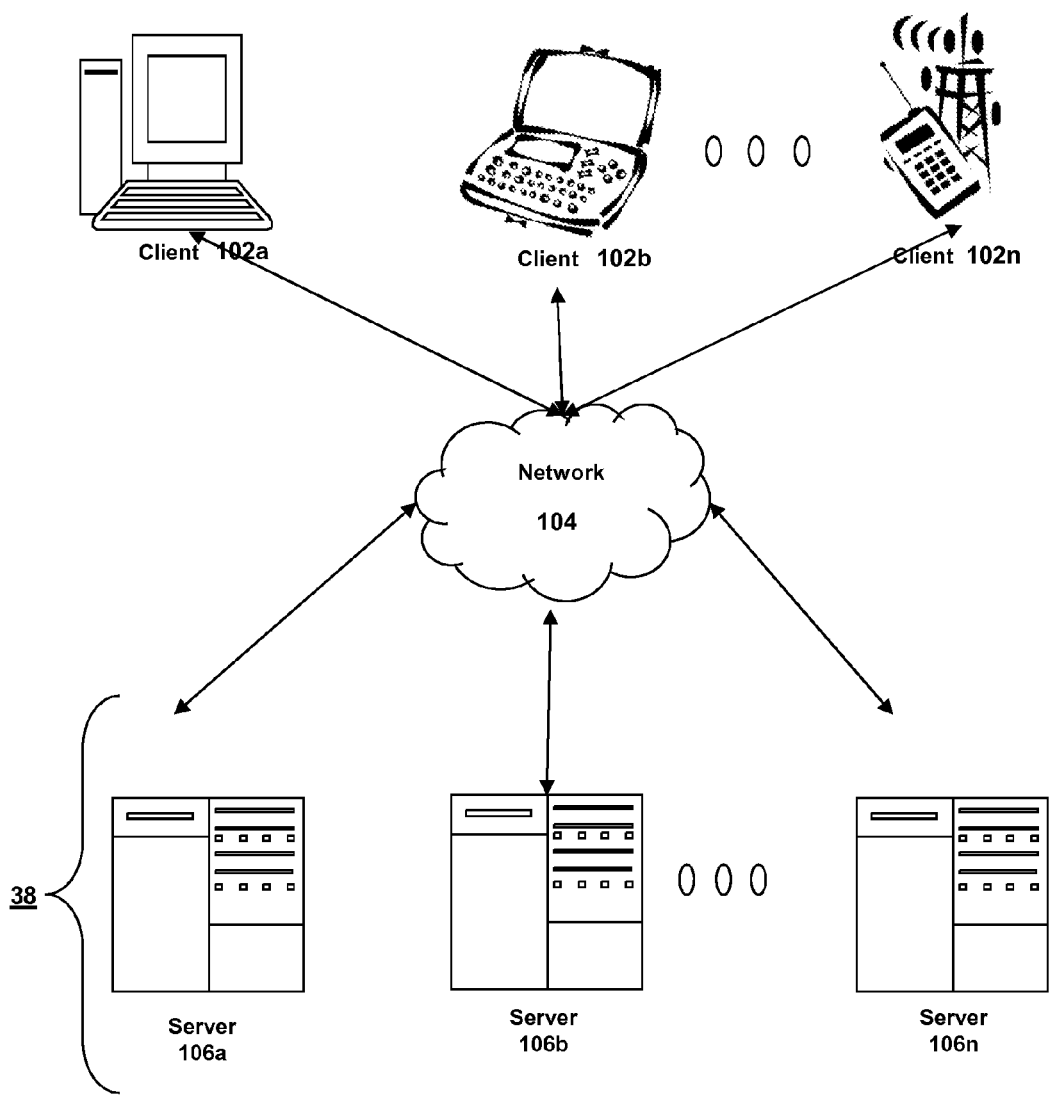
FIG. 1A is a block diagram depicting an embodiment of a network environment comprising client machines in communication with remote machines.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients $102a$-$102n$ (also generally referred to as local machine(s) 102, client(s) 102, client node(s) 102, client machine(s) 102, client computer(s) 102, client device(s) 102, endpoint(s) 102, or endpoint node(s) 102) in communication with one or more servers $106a$-$106n$ (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients $102a$-$102n$.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 102 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 102, forwards the requests to a second server 206b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

Figure 1B:
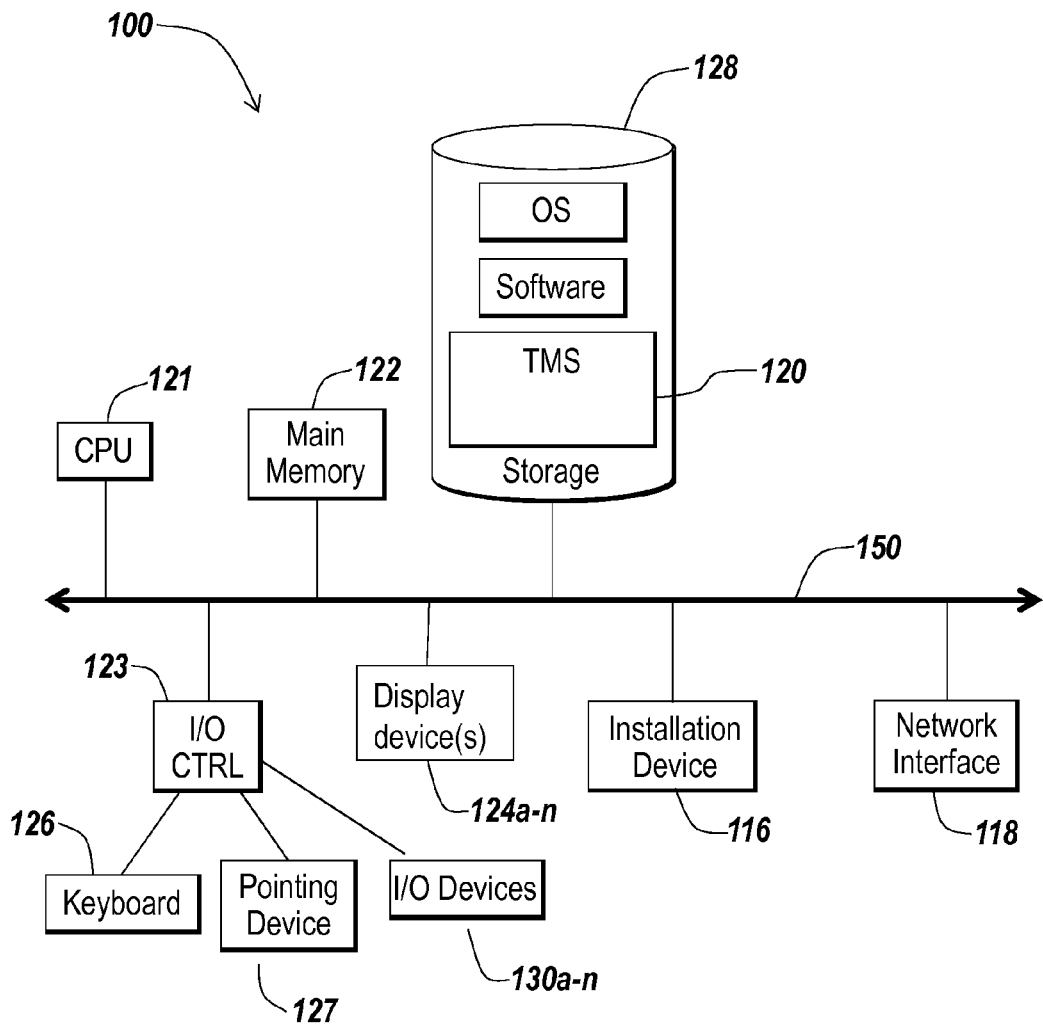
FIGS. 1B and 1C are block diagrams depicting embodiments of computing devices useful in connection with the methods and systems described herein.
Figure 1C:
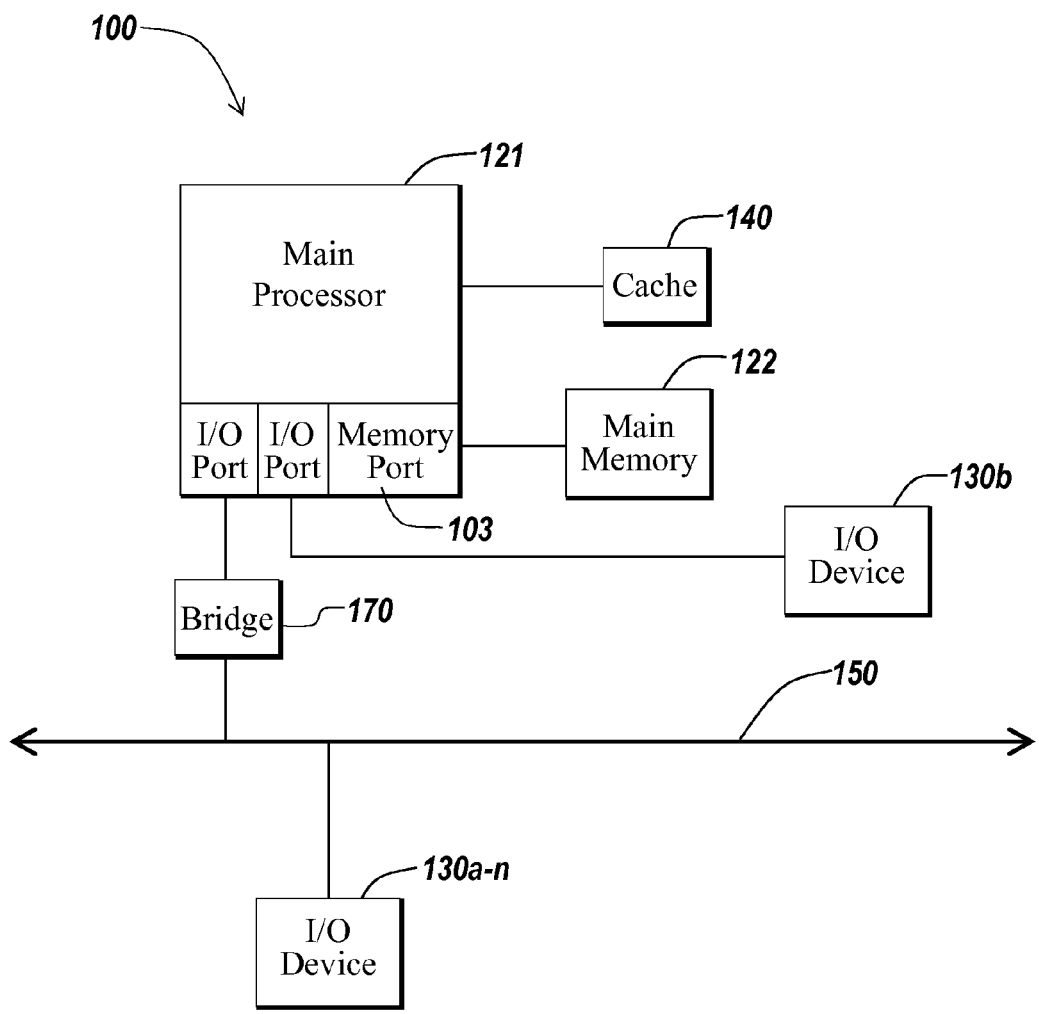

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a software of a tag management system 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the tag management system. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS XP, WINDOWS VISTA and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as the MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. 3-Tier Tag Container Architecture

In various aspects, the present disclosure is directed to methods and systems for a 3-tier Tag Container Architecture.

Traditional tag management systems and tag features may not be flexible, scalable and/or efficient when used in conjunction with a plurality of tags and/or tag types incorporated onto site pages. Various embodiments of the present methods and systems may provide a tag container architecture that can be used to replace and/or manage a plurality of tags and/or tag types. Upon incorporation onto a page, a tag container may provide rule customization (e.g., for one or more tags), and may do so without modifying web page or tag container hooking code on the web page. The tag container architecture may include three components or tiers: (1) config, which may provide parameters that indicate how a tag may integrate to a page, (2) template, which may include default or recommended tag properties, and (3) rules or transformers, which may be used to modify tag properties for various purposes. This architecture may allow rule customization, and may allow a tag management system to scale up in support of more and/or new tags, which may be from various vendors and/or of various types. In certain embodiments, the tag container may determine the context of each page load and may selectively activate/fire certain tags that the tag container manages. In doing so, the tag container may reduce page loading delays, e.g., due to the loading of a number of Iframes initiated by a plurality of disparate tags. The tag container(s) (e.g., in communication with a tag management system server) may track user behavior and may provide real time attribution to affiliates and/or partners of the website, e.g., responsive to a conversion.

In various embodiments, a tag container may comprise a mechanism to support and implement a plurality of heterogenous or disparate ad tags on a single web page. An ad tag may sometimes be referred to as a pixel, cookie or tracking code (hereafter sometimes generally referred to as "tag"). Ad tags may include HTML, JavaScript or other types of code that can be place on a site page in order to display ads and/or track user behavior. Ad tags may include information about a web site and/or types of ad units that may be displayed on a page. A network host may have control over the ad tags that are generated (e.g., using a Doubleclick Network Building (DNB)). The network host may be able to create custom ad tags for use on a publisher's site(s). The network host may share ad tag code with the publisher, and the publisher may insert the ad tag code into the publisher's site in order to display associated ads. In some embodiments, the network host may be an advertising vendor or partner.

There may be different types of ad tags that a network host or advertising partner can choose to create and share with a publisher or site owner. These include, without limitation, tag templates and dynamic tags. The network host may share one or more types of tags with a publisher. In the case of tag templates, a publisher can generate and/or retrieve ad tags based on tag templates that a network host has assigned or shared to the publisher's site(s). The network host can customize the tag templates with specific variables such as ad sizes, zone names, and key-value pairs. The information for each variable may be automatically included when a page load generates and/or retrieves one or more tags.

In some embodiments, a network host may provide dynamic tags. Dynamic tags may provide an alternative to using tag templates. The use of dynamic tags may allow a network host to make changes to ad tags on the back end (such as editing targeting information) without requiring a publisher to retag, e.g., replace or update a tag. Dynamic tags may be Javascript tags, and may wait for a page to load before capturing information from pre-defined variables or positions in the page. This captured information may then insert into the third-party tags before these tags are written out into a page or Iframe. Thus, new information can be passed into tags without the web developer having to amend the HTML source code. If a page already contains ad tags created using tag templates, these tags may continue to work, even if they are on the same page as dynamic tags. However, if a publisher has ad tags that are not created using tag templates, the publisher may want to replace them with dynamic tags, e.g., so that changes can be automatically applied on the back end. When using dynamic tags, a publisher may add a header tag and a tag for each ad slot on a page.

Figure 2A:
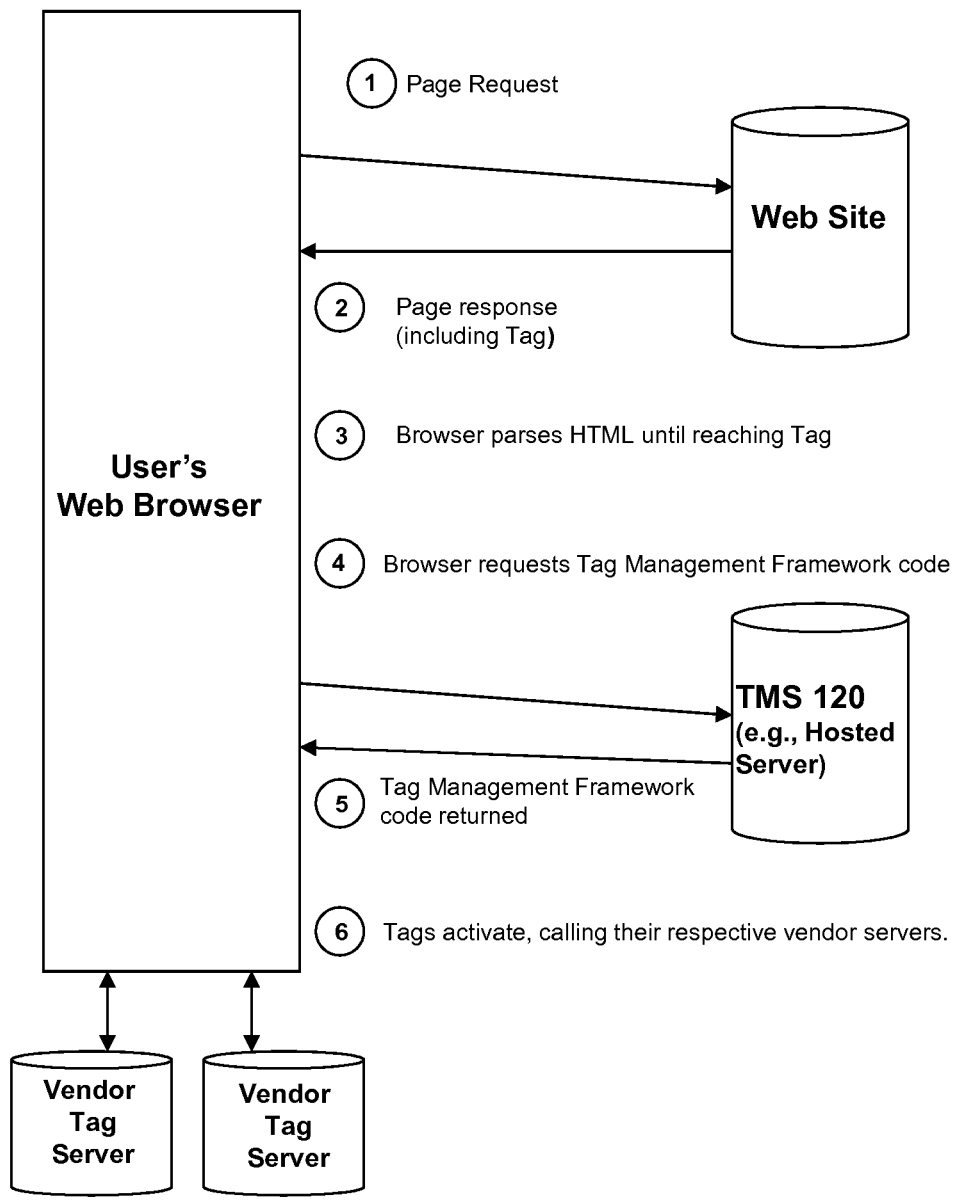
FIG. 2A is a block diagram depicting one embodiment of a system for a 3-tier tag container architecture.

In some embodiments, a tag container represents a single web page hook or container for one or more tags. The tag container may include tag management code that may be placed on a web page. The tag management code may be provided a tag management system hosted on a server (e.g., of a network host, publisher, partner or vendor). The tag container may include, appear as, or be represented by a single tag placed on a publisher's web page. The single tag can create calls to load any portion of a tag management framework and/or one or more tags. By way of illustration and not limitation, FIG. 2A depicts one embodiment of a HTTP communication flow between a web browser and server(s) in the delivery of a web page, activating of a corresponding tag, and delivery of an advertisement.

Figure 2B:
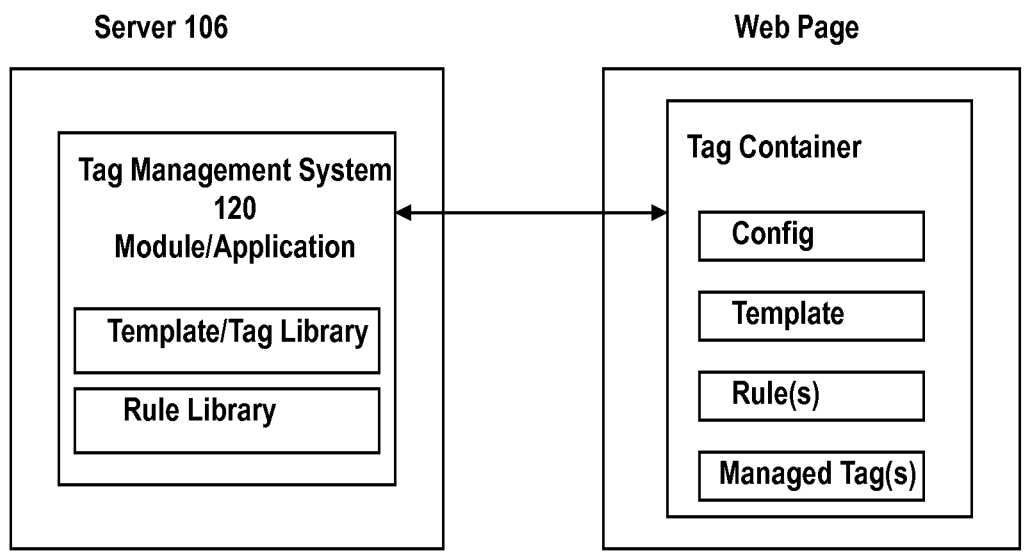
FIG. 2b is a block diagram depicting one embodiment of a flow diagram for transactions related to a page load and tag activation.

A tag management system (TMS) may be used to manage, control and/or coordinate analytics and the use and operation of a plurality of tags. These tags may be of different types and may serve different purposes. FIG. 2B depicts one embodiment of a TMS. In brief overview, the TMS may be hosted on a server 106, and may provide a tag container object for instantiation on one or more web pages. The TMS may include a template library and/or a rule library which may be referenced by each tag container instance. A TMS may sometimes be referred to as a tag server. A TMS can allow a publisher to manage and maintain tags from within a single application. A TMS can provide a consistent manner of controlling the data passed to third party marketing solutions, e.g., without requiring substantial IT effort and time. Marketing teams can use the TMS to turn around new marketing initiatives in shorter timeframes, and can set up business rules in the TMS to determine which tools are used to analyze and optimize the conversion of different customer segments that use the site.

A TMS can be used to enforce workflow and processes, and may lead to several benefits. Benefits may include, but is not limited to: (i) accuracy of overall analytics data; (ii) efficiency in adding tags at the right point in a development cycle; (iii) freedom of managing tags from one or more applications, flexibility in adding and testing new tags and/or reduced dependency on suppliers; (iv) ease-of-use and efficiency in tag management, offloading the amount of IT resources needed; (v) control of site compliance to technical best practices, privacy and/or other mandates; (vi) performance improvement in page load time, e.g., streamlining tags and serving tags only when appropriate.

In some embodiments, a TMS may provide accurate and/or real time attribution of an ad click and/or conversion to one or more affiliates or partners. TMS may do so via tag deployment using a tag container architecture. The TMS may identify and/or avoid duplication in attribution and may avoid duplicative or inaccurate payments to affiliates or partners. The TMS may optimize tag loads based on context (e.g., an associated user, search and/or page load). The TMS may optimize tag loads by selectively activating tags, which may be activated in a certain order to improve advertising/marketing impact or reach. For example and in certain embodiments, a TMS may handle events and flash interactions to improve load speed and/or user experience. The TMS application/ module may be designed and/or configured to run on any standard or custom hardware across one or more data centers. Data from tags, tag containers and/or data centers may be reported back to a TMS application in real time or near real time, e.g., via an n-tiered approach. In some embodiments, the TMS provide a single point to diagnose tag related performance issues, and may allow removal, modification and/or restoration of tags in connection with issue resolution.

In certain embodiments, a TMS may add, change and/or remove tags on production sites with proper validation. The TMS may enforce and structure a workflow around tag management that follows strict approval cycles, and may do so with a corresponding history log. The TMS may provide utilities to identify obsoleted and/or defective tags for unplugging or removal. The TMS, including the tag container architecture, may provide systematic and/or modular organization or separation of tag code, application code, and/or page code, so as to avoid errors and maintenance issues.

In some embodiments, a TMS may be hosted on one or more server(s) 106, appliance(s) and/or other network device(s). The TMS may be hosted on a hardware middle-tier, on-premise server and/or cloud-based service. The TMS may host any portion of a tag management framework, such as templates and/or libraries linked to a tag container or tag. The TMS may generate, publish, share, distribute, assign or otherwise provide tag container code to a publisher or a publisher's site. The tag container code may be incorporated or hooked to a page, which may be substantially similar to how a tag may be incorporated onto a page. In certain embodiments, the tag container may be placed before the closing body tag of a page. The tag container may be placed immediately before the closing body tag, for example, to improve the level of learning and/or tracking for an online campaign. In some embodiments, it may not be recommended to place a tag container before the opening body tag or after the closing body tag. In certain embodiments, (e.g., if the page is using frames and/or all pages are running under the same URL), the tag container may be inserted into the code of individual pages to be tagged that fill a main frame.

Referring again to FIG. 2B, the TMS includes a Javascript library, and tag container code that may be inserted in each web page. The library may be standardized and shared across clients so that users may download it once per session. When the page is loaded, an initial call to the TMS may retrieve parameter requirements. The TMS may wait for the page to complete loading before continuing. Tags may be written out (e.g., by the browser or page load based) into an iframe, along with the flash pixel. One advantage of writing tags out into an Iframe may be that the written Iframe does not delay the page from completing. If the business logic configured in the TMS dictates that no 3rd party tags are to be served, minimal code may be sent back to the page, keeping bandwidth to a minimum and reducing the impact on page download speed.

The TMS may provide and/or support a number of types of tag containers. The types of tag container may include but are not limited to the following: (i) Dynamic Javascript containers may be used to dynamically collect data from pages and/or to deploy solutions that need to run directly in the page; (ii) static Iframe tags may offer somewhat limited functionality (e.g., in relation to one or more other types) but can allay certain security concerns; (iii) static GIFs can be used to serve one tag per page, and may offer improved security; and (iv) redirect tags, which may be used to track exit pages and/or download links. Static Iframe tags and static GIF tags may not use Javascript.

In certain embodiments, a single tag container may replace all or a number of tracking pixels on an advertiser web page used to track, for example, natural search, paid search, affiliates, display, email or site analytics. The replaced tags may be housed, linked or referenced from within the tag container, and may be managed through a browser-base interface for example. Thus, tags from multiple channels can sit on or be managed by one system. The use of tag container(s) can be used to track activities to see the entire path to conversion (e.g., including keywords used in a search) that a user follows when taking action on one or more websites. In some embodiments, a tag container's JavaScript or code holds the tags that a publisher wants to deploy to the publisher's website. The tag container may select (e.g., in the browser) which tags to execute, for example, based on embedded or linked conditions. A TMS may operate in a client/server model where a tag container's JavaScript may ask a tag server or TMS host server which tags should be activated on a given page for a given user under defined conditions. In this model, such conditional decisions may be made on the TMS's server.

In some embodiments, a tag container, or each instance of a tag container, may include three layers, tiers or components, although not limited to these: a) Template, b) Config, and c) Rules. This architecture can provide flexibility, efficiency and scalability, e.g., allow rule customization while maintaining the rest of template and config intact, allows deployment of changes in the field to tag containers by changing the configuration or rules without changing the web page or tag container hooking code in web page, and allow scalability to take on additional and more tags from different vendors. The config component may determine or indicate how a tag integrates to the page, and may set parameters required by the tag. The template component may comprise a core tag template that may not change. In certain embodiments, such as in the TAGMAN TMS solution, the template refers to a TMAN.Tag or TAGMAN.Tag statement with default (e.g., recommended) tag properties. The transformers or rules component may be used to modify tag properties for a variety of purposes, e.g., for tuning site performance and/or adding targeting to when the tags are included. Transformers may apply the business rules of the TMS, which may correspond to a vendor, partner and/or campaign.

In some embodiments, tag container instances may be created from the component parts (e.g., using a addTagFromTemplate command, function or method). One embodiment of such a function is depicted below:

```
TAGMAN.addTagFromTemplate (
    LibraryTemplateId - Int - may be a unique template id from Tag
    Library,
    Version - Int - may be a version number of template,
    TagId - Int - may be a unique id for a created tag,
    Options.config - Object - may be an optional setting of tag params
or mapping of parameters,
    Options.tranformers - may be an Array of transformer Ids
);
```

In the above embodiment, Template and version may, for example, be replaced with a single TemplateId for the client. By using a same library, template and/or version, a single set of templates can be cached across clients which may be easier to maintain and/or support. In some embodiments, tag parameters are specified and/or maintained at the tag level. In other embodiments, parameters may be defined, specified and/or maintained at the tag container level, and parameters for a tag may be inherited from the tag container (e.g., if multiple accounts exists). Tag parameters (e.g., container or default parameters) can be overridden by tag level or tag-specific parameter values.

In some embodiments, the config component or tier is applied followed by the transformers or rules component. Both of these components may be applied before steps such as preloading and/or caching steps (e.g., initiated by doTags runs). In some embodiments, when applied, a tag container may appear like a tag with parameters and business logic hard coded into the tag.

In various embodiments, the tag config may include a mapping of parameters to tags. The config may assign particular parameters to a specific tag or group/subset of tags. The config may assign particular tags to a specific parameters or group/subset of parameters. When creating the tag config, one may either select defined parameters (e.g., from a drop down menu of an interface of the TMS) or add text parameters for hardcoded values such as account id, etc.

In some embodiments, a config object may be defined in JavaScript Object Notation (JSON) or another format, and may include static params (e.g., for hardcoded values) and/or mapped params (e.g., for parameters being used from the container, for any container type). One embodiment of an config object is depicted below:

```
config: {
    static: {
        'accountid': 'kjdflksdjf',
        'domain'   : 'xyz.com'
    },
    mapped: {
        'revenue'     : 'levrev',
        'description' : 'levresdes'
    }
}
```

In some embodiments, such as in the TAGMAN context, configs can be added either by a Tag.addConfig function call or statement, or by passing as an argument to a TMAN.addTagTemplateById function call or statement. In certain embodiments, configs (e.g., config parameters) are specific to a tag. Thus, it may not be suitable in certain contexts to have a normalized library of configs. Configs may be generated straight into the addTagTemplateById statements (e.g., command or function call) in deployment outputs.

In some embodiments, the template component is a core portion of a tag container (e.g., TMAN.Tag) that is maintained within a tag library. The tag library may be maintained by vendors, partners, publishers, network hosts and/or other entities. The template component may include default or recommended properties (e.g., indicate if a tag is async or sync, in loading manner, etc, specify a position to execute a tag at, etc). In some embodiments, such as in the TAGMAN context, a template may be added using a Container.addTemplate statement or function. One embodiment of such a function is depicted below:

```
Container.addTemplate ( 1,
    new TAGMAN.Tag ( 0, '// I require {{aparam}}', {
        position: TMAN.position.PRE_HEAD,
        async: true,
        requiredScripts: [ 'http://example.com/js/resource1.js',
'http://www.example.com/js/resource2.js' ],
        executeRequiredScripts: true,
    })
);
```

In the above example, the id may be set to 0, and a final Id may be set as a tag is added. Some templates may be added to a tag or page by default, some may be client-specific and/or custom. In certain embodiments, permissions settings (e.g., in a library) may dictate or determine which template a user or developer has access to. In some embodiments, templates are added by users (e.g., power users) via developer tools (e.g., tagmanifier) and/or an application programming interface (API) provided by the TMS. In certain embodiments, parameters in a tag template may be defined or identified using a known or standard convention (e.g., using double curly braces to mark or enclose a parameter location). During deployment (e.g., when a template is loaded to a page), an appropriate substitution can be made to the identified code location. These parameters may be tag specific.

In some embodiments, the rules or transformers component of a tag container may be used to modify one or more tag properties. The rules or transformers component may be used to modify one or more tag properties of a specific tag or group of tags. The rules or transformers component may include a plurality of rules, policies and/or parameter/tag modifiers (hereafter sometimes generally referred to as "rules" or "transformers"). One or more rules can be used to change how a tag is loaded by a corresponding tag container (e.g., which smart loading features to use) and/or business logic that determines if a tag should be loaded at all. Transformers may be used to add third party data (e.g., geo or segment data) to one or more tags. Transformers may be designed and/or built for manipulating a tag object. A transformer may be applied to a tag, for example, using a TMS statement of command (e.g., Container.getTransformer(1).apply(TMAN.getTag(32))).

In some embodiments, transformers may be added to a client user account according to permissions. Transformers may be added to and/or retrieved from a rules library. Transformers may be maintained in a library and/or accessed from the library. Transformers can be applied to multiple tags (e.g., of the same type or different types). Transformers may be expressed or represented by pieces of code that may be loaded or executed by a browser running on a client device. In some embodiments, transformers may be managed via the TMS' developer toolkit (e.g., tagmanifier) and/or API. In certain embodiments, transformers may be added to a client user account by default. Some transformers may be client-specific and/or custom. For example, a particular vendor may want to add features to an existing tag. These features may be updated or added to the existing tag when the tag container activates the tag and applies a corresponding transformer to incorporate these features.

A transformer may be one of several types. Transformers may include tuning transformers. Tuning transformers may include rules about how a tag should be loaded. Such rules may not act as conditions for an individual user. Tuning transformers may include settings and/or technical configuration for a tag. For example, tuning transformers may specify or change a (i) position at which to activate or fire a tag, (ii) tag timeout period, (iii) smart or selective loading of tags (e.g., removing certain scripts), (iv) specify parameters that should or must be defined, and/or (v) to make a tag or parameter movable. By way of example, the following embodiment of a transformer sets a tag to load when an onload statement is executed:

```
// execute onload
TAGMAN.Container.addTransformer(
    1,
```

```
        function ( ) {
            this.position = TAGMAN.position.WINDOW_LOAD;
        }
    );
```

In some embodiments, transformers may include targeting transformers. Targeting transformers may include rules about when the tag should be loaded. By way of illustration and not intended to be limiting, targeting transformers may specify or modify the following aspects of a tag: (i) Frequency Cap, (ii) Serve on opt out, (iii) 3rd party data rule (e.g., include geo data), (iv) 1st party data rule (e.g., segment data), (v) campaign history (e.g., storing or updating activities), and (vi) page context. By way of example, the following transformer calls a third party API (e.g., API of type JSON with padding (JSONP)) to get a value of DENV.geo and allows tags to fire if a geo attribute is UK:

```
TAGMAN.Container.addTransformer(
    3,
    function ( ) {
        this.addRequiredScript( 'http://xys.eom/x.js' , true );
        this.andCanExecute(
            function( ) {
                return ( DENV.geo === 'UK' );
            }
        );
    }
}
```

The following are example TMS commands or functions for using or configuring a tag container:
(1) getTagParam (name, tagid, [account])—for accessing the value of a parameter. If a parameter is not defined for an identifier tag, TMS may look at the tag container the tag is in, e.g., by using container.getParam.
(2) addTemplate (id, Tag—instance of TAGMAN.Tag)—for adding a code template to be used by a addFromTemplate function call.
(3) addTransformer (id, function)—for adding a transformer to be used by a addFromTemplate function call.
(4) addTagFromTemplate (TemplateId, Version, TagId, config, options)—for creating a tag container instance from the component parts (e.g., config, template and rules).

The following are example container commands or functions for querying parameters, and loading or configuring a tag:
(1) Param—to allow parameters to be overriden on a tag by tag basis. This statement can accept a static value or a function that returns a value (e.g., for mapping dynamic parameters, etc).
(2) requiredParameters( )—returns an array of parameters required by the tag.
(3) hasRequiredParameters( )—returns true if required parameters are found and have valid values (e.g., anything other than null, undefined or a blank string).
(4) addRequiredScript(location, executeRequiredScript)—executeRequired script may be a global property. This script may be specified for loading in response to 3rd party API calls.
(5) getParam (name)—gets a parameter if the parameter has been defined for the corresponding tag. Else, may look down the container tree for the parameter.
(6) setParam (name,value)—sets the parameter, which can be a static value or a function.
(7) addConfig(object)—applies config, sets parameters using above setter.
(8) set/get[Property] —sets/gets a property.
(9) and CanExecute(function)—chains the function to an existing canExecute function (e.g., effectively creating a logical AND). An example embodiment of the function is as follows:

```
_oldCanExecute = this.canExecute; this.canExecute = function ( ) {
    if (_oldCanExecute( ) ) {
        return inFunction( );
    } else {
        return false;
    }
}
```

By way of illustration and not intended to be limiting in any way, the following depicts embodiments of implementations in connection with the TMS and tag container:

```
TAGMAN.addTagFromTemplate (
    4,    /* LibraryTemplateId */
    1,    /* Template Version */
    5,    /* TagId */
    {
        config: {
            static { 'accountid': '1ewqoiqewaA', name: 'terry' },
            mapped: { 'revenue': 'levrev','description': 'levresdes }
        },
        transformers: [1,5,6,7]
    }
);
Container.addTagTransformer (
    Id (int),
    rule (function)
);
// execute onload
TAGMAN.Container.addTransformer(
    1,
    function ( ) {
        this.position = TAGMAN.position.WINDOW_LOAD;
    }
);
// don't execute if on checkout
TAGMAN.Container.addTransformer(
    2,
    function ( ) {
        if (location.href.indexOf(checkout)) {
            this.andCanExecute(
                function( ) {
                    return !TAGMAN.getOptOut( );
                }
            );
        }
    }
);
// Serve to UK traffic
TAGMAN.Container.addTransformer(
    3,
    function ( ) {
        this.addRequiredScript( 'http://xys.eom/x.js' , true );
        this.andCanExecute(
            function( ) {
                return ( DENV.geo === 'UK' );
            }
        );
    }
}
// Men Only
TAGMAN.Container.addTransformer(
    4,
    function ( ) {
        this.andCanExecute(
            function( ) {
                // this param could be passed in from the config
                return ( this.getParam('gender') == 'MALE' );
            }
```

```
    );
  }
}
// 1s timeout (we should be using setters really rather than updating
properties directly)
TAGMAN.Container.addTransformer(
    5,
    function () {
        this.timeout = 1000;
    }
)
Container.addTemplate (
    1,
    new TAGMAN.Tag (
        1,
        '// I require {{aparam}}',
        {
            position: TMAN.position.PRE_HEAD,
            async: false,
            requiredScripts: [ 'http://example.com/js/resource1.js',
'http://www.example.com/js/resource2.js' ],
        }
    )
);
Container.addTemplate (
    2,
    new TAGMAN.Tag (
        1,
        'alert(456)',
        {
            position: 10,
            async: false,
            requiredScripts: [ 'http://example.com/js/resource1.js',
'http://www.example.com/js/resource2.js' ],
        }
    )
);
// de-dupe / hide tag if campaign not in path ( att score = 0 )
TAGMAN.Container.addTransformer(
    6,
    function () {
        return !!TAGMAN.TRACK.getScore( this.campaignIds); //
        returns score
summed accross campaigns in input array.
    }
}
```

Figure 2C:
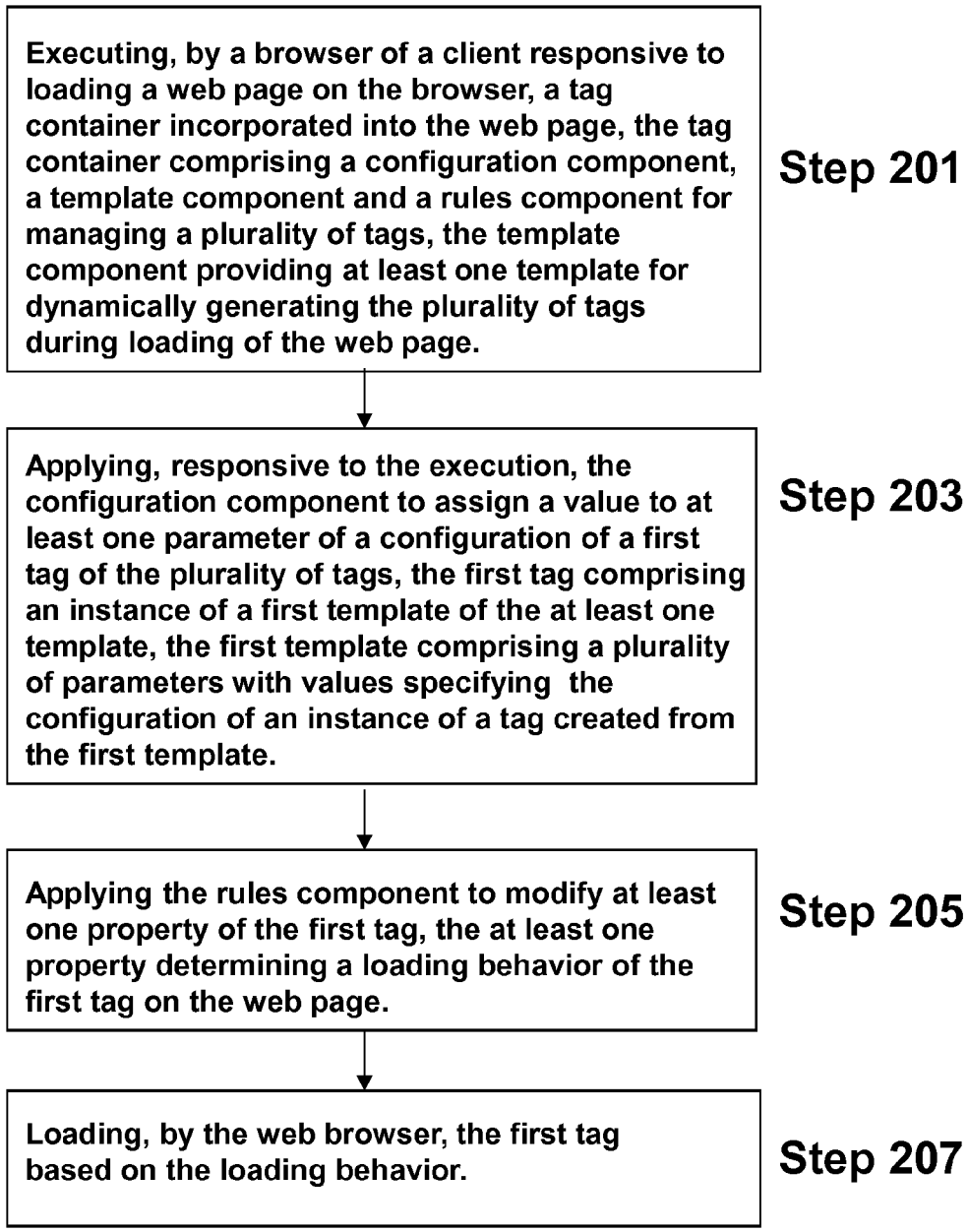
FIG. 2C is a flow diagram depicting one embodiment of a method for a 3-tier tag container architecture.

Referring now to FIG. 2C, one embodiment of a method for using a tag container having a 3-tier architecture is depicted. This may comprise an embodiment of a method for managing a plurality of tags in a web page using a tag container. The method may include executing, by a browser of a client responsive to loading a web page on the browser, a tag container incorporated into the web page (201). The tag container may include one or more of a configuration component, a template component and a rules component for managing a plurality of tags. The template component may provide at least one template for dynamically generating the plurality of tags during loading of the web page. The tag container may apply, responsive to the execution, the configuration component to assign a value to at least one parameter of a configuration of a first tag of the plurality of tags (203). The first tag may be based on, or comprise an instance of a first template of the at least one template. The first template may include a plurality of parameters with values specifying the configuration of an instance of a tag created from the first template. The tag container may apply the rules component to modify at least one property of the first tag (205). The at least one property may determine a loading behavior of the first tag on the web page. The web browser may load the first tag based on the loading behavior (207).

Referring now to (201), in more detail, a browser or application of a client may execute, responsive to loading a web page on the browser, a tag container incorporated into the web page. The tag container may comprise any type or form of executable code, script or instructions, such as JavaScript, ActionScript, a plug-in or library-based code. The tag container may, for example, include nested conditions for executing portions of the code. The tag container may include conditions for activating each of the tags, e.g., based on a context of the page load, pertaining to user, geo data, etc. The tag container may include code that are structured, arranged and/or partitioned modularly and/or hierarchically. In certain embodiments, the tag container may include code and/or components that are self-contained or substantially self-contained for execution or operation on the web page. For example, the tag container may receive parameters values or configuration values from the web page, from the browser or based on the loading of the web page. In some embodiments, the tag container may not have to access additional code, functions, libraries and/or components from a server, for example.

In certain embodiments, the tag container may dynamically access, during loading of the web page or execution, a server (e.g., TMS or tag server) for at least one of: the configuration component, the template component and the rules component. The tag container may include instructions for calling to a remote tag server or tag management system during execution (e.g., during a configuration phase, or during tag creation). For example, the TMS may include code, instructions and/or data corresponding to at least one of: the configuration component, the template component and the rules component. By way of illustration and in some embodiments, the TMS may maintain, store or include a collection, library or database of parameter values for the configuration component. The TMS may maintain, store or include a collection, library or database of tag templates for the template component. Moreover, the TMS may maintain, store or include a collection, library or database of rules or transformers for the rules component. The tag container may comprise one or more references or paths to at least one script located at one or more locations (e.g., the TMS, a network server or database). The tag container may include one or more of HTML anchor codes, a configuration component, a template component and a rules component for managing a plurality of tags. In some embodiments, the tag container includes a 3-tier configuration based on the configuration component, template component and rules component.

The tag container may be instantiated, inserted or incorporated into a web page or HTML document. The tag container may be incorporated into a web page in place of one or more tags (e.g., provided by a vendor, partner or third-party). The tag container may be configured to include a fixed and/or reusable portion of code (e.g., hooking code) and/or refer to components via predetermined path(s). Once incorporated into a web page, the tag container and/or the number and/or type of tags supported by the tag container, may be updated dynamically upon execution (e.g., the tag container in communication with a remote tag server or tag management system). The tag container code or instance may be designed and/or written for configurability and/or scalability, and may be deployed across different web pages to support different sets and/or types of tags. The tag container code (e.g., hooking or script/component referencing code), after incorporated into a web page, may not have to be updated by the publisher or any entity. The tag container code may execute to generate or incorporate new tags introduced after the tag container code has been instantiated into the web page.

A publisher, a web site host or a network host/intermediary may insert a tag container onto a web page. One or more tag containers may be inserted or instantiated at various locations within a web page (e.g., in a header or body portion, at the beginning, end or middle of the corresponding portion). In some embodiments, the tag container code is inserted before (e.g., immediately before) a closing body tag of the web page. In other embodiments, the tag container code is inserted elsewhere in the web page. A tag container may be nested within another tag container, e.g., as a child container. A hierarchy of tag containers may be configured to manage a plurality of tags and/or types of tags. A tag management system or TMS (e.g., of a host network, vendor or partner) may generate and/or provide the tag container to the publisher. The TMS may provide any one or a plurality of types of tag containers as discussed above in connection with FIG. 2B. A web page publisher may, for example, instantiate the tag container onto one or more web pages. A tag container instantiation may link to one or more libraries (e.g., script, template and/or rule libraries) hosted on a tag server (e.g., server 106) or the TMS. The publisher may hook or incorporate code of the tag container onto a web page.

The tag container may comprise a configuration component, a template component and a rules component, for example also discussed above in connection with FIG. 2B. The web browser, TMS and/or publisher may assemble a tag container from its components (e.g., config, template and rules), for example, by identifying and/or accessing a template library, template identifier, client-specific rules, and/or by specifying one or more tag-specific parameters. The web browser may, for example, access the TMS in assembling the tag container and/or one or more tags of the tag container. The publisher may specify client-specific and/or custom rules, and/or parameters for one or more tags in the container. In some embodiments, the web page and/or browser may provide parameter values (e.g., based on the web page loading context) to configure a tag container or affect operation of the tag container.

In certain embodiments, the web browser may dynamically assemble and/or configure a tag container during loading of the web page, for example, based on the web page loading context. For example, the tag container may identify one or more tags from the plurality of tags to generate, based on a context of the loading of the web page. The tag container may identify not to load or generate one or more tags from the plurality of tags, based on a context of the loading of the web page. By way of illustration, the tag container may identify a tag to load or not to load based on information such as geo, user gender, time of day information. The tag container may determine whether to load or activate a tag based on properties or business rules (e.g., specified by a tag provider such as a vendor or an analytics partner) incorporated with the tag. The tag container may determine a sequence for generating and/or loading at least a subset of a plurality of tags managed by the tag container. For example, the tag container may load these tags synchronously or asynchronously, and may sequence the loading of the tags based on bandwidth, size, resource availability and/or other considerations.

The tag container may manage and/or generate a plurality of tags, e.g., tags of various types, from various vendors, and/or for different purposes. A publisher or the TMS may remove a number of existing tags on a page, or replace existing tags with the tag container. The tag container may generate, hold and/or manage the existing tags within the tag container. The publisher, vendors and/or partners may add new tags to the tag container, for example via the template, configuration and/or rules components.

A user may click on a link, execute a browser, or otherwise initiate loading of the web page via the web browser. In some embodiments, the web browser links to the one or more libraries hosted on the server 106, which may be maintained or managed by the TMS and/or a vendor. In certain embodiments, the tag container retrieves, via its template component, a tag template from a tag library or a template library, e.g., based on a library and/or template identifier identified in the tag container or by the TMS. The tag container may execute or access the template component responsive to loading of the web page on the browser. The template component may provide at least one template for dynamically generating the plurality of tags during loading of the web page. The tag container may identify a tag from the plurality of tags to generate, based on a context of the loading of the web page. For example, in some embodiments, based on content and/or an identity of a user of the web page, it may be desirable or beneficial for a marketing or advertisement tag to be present. The tag container may identify via the template component, a corresponding or an appropriate template (e.g., a first template) for generating the tag, e.g., based on the functionality, type and/or origin (e.g., vendor) of the tag. The web browser and/or tag container may assemble, create or generate a tag (e.g., a first tag) from an instance of the template, e.g., using default or recommended properties specified in the template. The tag may comprise an instance of a first template of the at least one template. The first template may include a plurality of parameters with values specifying the configuration of an instance of a tag created from the first template. The web browser and/or tag container may assemble, create or generate additional tag(s) in sequence or in parallel.

The template component may provide at least one template for dynamically generating the plurality of tags during loading of the web page. By way of illustration, the template component may provide a template for a type of tag (e.g., based on tag functionality) or a similar group of tags. The template component may provide a template for tags from a particular vendor, partner or third-party, or for a specific group of vendors, partners or third-parties. By way of illustration, a vendor may provide a template for the vendor's tags, for example, a template with properties representative of the vendor's tags. A template may include at least one parameter, each with a value for specifying a configuration of an instance of a tag created from the first template. The template may include a default value for a parameter. For example, a parameter may specify a manner by which a corresponding tag integrates with the web page (e.g., with account-specific information, or a location for placing/activating the tag in the web page). The template may include default and/or standard properties or functionalities for a tag. For example, the properties or functionalities may include business rules for loading, activating and/or executing a tag in the web page.

Referring now to (203), in more detail, the web browser may apply, responsive to loading the web page, the config component to a tag of the plurality of tags. Responsive to the execution of the tag container and/or responsive to the loading of the web page, the tag container may invoke, access and/or apply the configuration component to assign a value to at least one parameter of a configuration of one tag (e.g., a first tag) of the plurality of tags. The tag container may remotely access all or some portion of the configuration component, e.g., from the TMS or tag server. For example, the TMS may provide parameter values and/or instructions for applying the values to a template instance. The web browser and/or the tag container may apply the config component to the tag or template instance. The tag container or web browser may identify specific configuration data, e.g., tag-specific parameters, to apply to the tag. The tag container or web browser may use the configuration component to set parameter values for the tag.

The tag container or web browser may override or replace standard, default or recommended parameter values or properties (e.g., specified in the template instance) with the tag-specific parameters or config. The tag container or web browser may apply the configuration component to specify how the tag integrates to the page via the parameter values.

In some embodiments, the tag container may assign a value to at least one parameter. The tag container may assign the parameter value to the instance of the template corresponding to the first tag. The at least one parameter may specify one or more of: a location of a tag in the web page, synchronous or asynchronous loading of a tag, user-specific information, domain or web page information, campaign information, account information, identification of a tag, and session information. For example, the location of a tag may determine a region of the web page where the tag may operate, be loaded or triggered. A parameter may specify a manner in which a tag may be integrated into the web page. For example, a parameter may specify whether is tag is to be loaded synchronously or asynchronously relative to other tags or elements of the web page. Yet other parameters may include values comprising information about a specific user or user account (e.g., an account identifier), an identifier for the tag after being generated, session information (e.g., timeout information), and other information described above in connection with FIGS. 2A and 2B. A parameter may be classified as static (e.g., for specifying account ID and domain information), or mapped (e.g., for specifying revenue, mapped to a variable or function for example). A user or administrator may select or specify a value for a parameter (e.g., via a graphical user interface or a configuration file) to be maintained and/or administered by the configuration module for managed tags.

Referring now to (205), in more detail, the web browser may apply the rules component to modify at least one property of the first tag. The at least one property may determine a loading behavior of the first tag on the web page. The loading behavior may specify if a tag is to be loaded or triggered on a web page, e.g., based on a context of the web page's loading. For example, a tag may be loaded if geo, user gender, and/or a frequency cap limit is met. The loading behavior may specify when a tag or certain functionality of the tag is to be loaded or triggered on a web page, e.g., for gathering analytics or providing real time attribution to affiliates or partners responsive to a conversion. In certain embodiments, the web browser retrieves one or more rules/transformers from a rules library. The web browser may apply the rules component to the tag responsive to, or after applying the config component. The web browser may apply the rules component if the config component is successfully applied. The tag container or web browser may identify specific rules, e.g., tag-specific transformers, to apply to the tag. The tag container or web browser may identify client-specific rules to apply to a particular tag.

The tag container or web browser may use the rules to manipulate, modify or update properties for the tag. The tag container or web browser may apply the rules to modify business logic (e.g., from the tag) that indicates if, how and/or when a tag may be loaded. The rules component may incorporate business rules corresponding to at least one of a vendor, a partner and a campaign, into the instance of the template corresponding to the tag. For example, a tag-providing vendor or partner may provide rules and/or business logic to the rules component. An ad campaign administrator may provide rules and/or business logic specific to a particular campaign.

The tag container or web browser may apply the rules to specify how the tag may be loaded (e.g., which smart loading features to utilize). For example, one or more rules may specify or modify the time-out duration for loading a tag, a position for the tag, making a tag movable, directing a tag to load onload, and may identify parameters that should be defined (e.g., to specify how a tag should be loaded). Such rules are sometimes referred to as tuning transformers. In some embodiments, some rules are used to personalize loading characteristics of a tag (e.g., a frequency cap, serve tag on opt out, execute on load, do not load tag on checkout), or to incorporate requirements or data into a tag (e.g., gender, or specific day/time periods, third party data such as geo data, first party data such as segment data, page context information), to provide direction about when a tag is to be loaded for example. Such transformers may sometimes be referred to as targeting transformers. For example, a tag transformer may incorporate a call to a third party JSON API to get a geo value and fire a tag if the value is "UK".

Accordingly, the tag container may dynamically generate, during the loading of the web page, a plurality of tags as instances of the at least one template, may configure the instances with one or more parameter values assigned via the configuration component, and may modify at least one property of the instances using one or more rules provided via the rules component. One or more tags from various providers may be identified, their functionalities determined, and translated into one or more templates, parameter values and/or property transformation rules. As such, these one or more tags may be replaced or "managed" by a tag container as disclosed herein.

Referring now to (207), in more detail, the web browser may load the tag (e.g., first tag) based on the modified properties. The tag container may dynamically generate or write the tag to the web page or browser. The modified properties may determine a loading behavior of the tag on the web page. The web browser may load the first tag based on the loading behavior. In some embodiments, the tag container may write the tag into an iframe within the web page for loading. The tag container may write each of a plurality of tags into a different iframe, for example, so that the tags may load asynchronously. The tag container may write a group of tags into a iframe, for example to load these tags synchronously.

The web browser may determine if the tag is fully formed or modified by the config and/or rules. The web browser may determine if the tag is successfully updated with the config and/or rules, e.g., prior to expiry of a time-out period. The web browser may determine, based on the tag container, whether one or more tags are available or selected to be fired or activated. The web browser may determine, based on the tag container, a sequence for firing or activating a number of tags managed by the tag container. The tag container may indicate to the web browser which tag(s) to activate or execute, e.g., based on the context, user, etc. The web browser may activate each tag based on the respective tag's modified or updated properties/parameters. The tag container may suppress certain tags, e.g., based on the context, user, etc. The tag container may suppress or terminate certain tags based on erroneous or problematic loading of such tags, e.g., to prevent significant impact to user experience.

In some embodiments, the tag container may support asynchronous and/or synchronous modes during loading. A main script may appear before the <head> tag (e.g., to illustrate an early point of implementation). <div> and/or <script> tag locations may appear at one or more locations, e.g., throughout the page. The tag container code may place tags in designated locations within the page, and may provide support for multi-part tags. One illustrative embodiment of a tag container is depicted below:

```
<script>
(function (w) {
    w.tm2BootPosition = 0;
    w.tm2BootAsync = true;
    w.tmPageId = 1,
    w.tmParam = { param1: 'Value1',
        PageCoded2: 'value2'
    };
    var conf = { host: 'pfa.levexis.com',
        account: 'CLIENTNAME',
        version: '3',
        async: true,
        cdn: (location.protocol === 'https:') ? 'sec.levexis.com' :
'res.levexis.com',
        waitService: 'wt.tagman.com',
        waitTest: false,
        bootstrap: true,
        param: w.tmParam || { } };
    // do not change values below this line
    function ap(sr , ol) {
        var e = document.createElement('script');
        e.src = sr;
        e.async = true;
        if (ol) {
            e.onload = e.onerror = function( ) { if (!this.loaded) { ol( );
this.loaded = true; } };
            e.onreadystatechange = function( ) { if (this.readyState ===
'complete' || this.readyState === 'loaded') { this.onload( ); } };
        }
        var s = document.getElementsByTagName('script')[0];
        s.parentNode.insertBefore( e , s);
    }
    w.TMAN = w.TMAN || { };
    w.TMAN.startTime = +new Date( );
    w.TMAN.asyncLoader = function( ) {
        TMAN.addContainer( new TMAN.Container(conf.account,
w.tmPageId, conf) );
    };
    var tm = '//' + conf.cdn + '/clientfiles/v' + conf.version + '/' +
conf.account + '.js';
    if (conf.waitService && conf.waitTest) ap ( '//' + conf.waitService +
'/wait/0/' + Math.random( ) , function( ) { TMAN.waitLatency=new
Date( ) –
TMAN.startTime; } );
    if (conf.async) {
        w.TMAN.position = { };
        w.TMAN.doTags = function(p) { TMAN.currentPosition = p; };
        w.TMAN.addParam = function(n,v) {
            w.tmParam[n]=v;
        };
        ap(tm);
    } else {
        document.write('<script src="' + tm + '"><\/script>');
    }
})(window);</script>
```

In some embodiment, a first portion of the tag container may include a configuration of how the container behaves. This portion may include lines prior to "// do not change values below this line". Tag containers may be configured through a user interface of the TMS. A tag container may be initialized using configuration parameters in the first portion. Client and/or page-specific parameters may be defined in the w.tmParam object. When the tag container is initialized, it may be passed a client's schema name, which may replace the CLIENTNAME placeholder in the example. It may also be passed a tmPageId variable and/or a configuration object, that may specify how the container behaves.

In some embodiments, one implementation location for the TagMan container is at the top of the <head> section of the page. In other embodiments, the container can be loaded at various other locations in the page. Position specific tag calls may be added to a page. The following are illustrative of tag calls that can be added:

In some embodiments, a publisher may add the following between the <html> and <head> sections of the page, just before the opening <head> tag:

```
<script>
    TMAN.doTags(TMAN.position.PRE_HEAD);
</script>
```

In some embodiments, a publisher may add the following at the top of the head section of the page, after the opening <head> tag: <script>TMAN.doTags(TMAN.position.TOP-HEAD);</script>

For example, when a container has been initialized and added to the page, position specific tag calls can be added. Such calls may execute tags that have been configured through TMS to be implemented at this position (e.g., at the top of the <head> section).

In some embodiments, a publisher may add the following at the bottom of the head section of the page, before the closing </head> tag: <script>TMAN.doTags(TMAN.position.BOTTOMHEAD);</script>

In some embodiments, a publisher may add the following at the top of the body section of the page, after the opening <body> tag:

```
<div id="TMAN_TOP_BODY"></div>
<script>
    TMAN.doTags(TMAN.position.TOP_BODY);
</script>
```

In certain embodiments, positions within the BODY can be used to deliver synchronous tags. One or more positions may be used to deliver asynchronous tags.

In some embodiments, a publisher may add the following at the bottom of the body section of the page, before the closing </body> tag:

```
<div id="TMAN_BOTTOM_BODY"></div>
<script>
    TMAN.doTags(TMAN.position.BOTTOM_BODY);
</script>
```

In certain embodiments, the tag container allows definition of additional positions within the <BODY> of a page. These positions may be defined by inserting a block of code, such as the following, into the target position of the page.

```
<div id="TMAN_POSITIONNAME"></div>
<script>
    TMAN.doTags(TMAN.position.POSITIONNAME);
</script>
```

Numerical positions from 4-30 (inclusive) may be available for custom use. Each name may correspond to a numerical position. If names cannot be created or DIVs cannot be implemented, a numerical implementation like below may suffice.

```
<script>
    TMAN.doTags(4);
</script>
```

In some embodiments, it may be desirable or necessary to add a parameter on a page, e.g., during a page load or page operation (e.g. in the middle of the page). The following code may be inserted into the page when the new parameter is available to the page. In this code block, there may be placeholders for a name and value of the parameter.

```
TMAN.addParam('name','value');
For example:
```

```
TMAN.addParam('color','red'); // for a text string
TMAN.addParam('pi',3.14159); // for a number
```

In certain embodiments, the container may generate (e.g., dynamically) a URL to call a client-specific JavaScript file. Such a file may include mapping information, client specific JavaScript code and/or libraries.

By way of illustration, the URL may be expressed as: http://res.levexis.com/clientfiles/v3/CLIENTNAME.js In certain embodiments, one or more tag containers may reside on a page. For example, the "account" parameter may be uniquely specified for each of such containers. The TMS can be configured to serve one or more tag containers from within a tag container. In some such embodiments, the "child" tag container may inherit options from a "parent" tag container.

In certain embodiments, a tag container configuration may have a number of required and/or optional parameters. By way of illustration and not intended to be limiting, such parameters may include:

| Parameter name | Type | Default | Explanation |
| --- | --- | --- | --- |
| w.tm2BootPosition | Number | | The page position at which the container will load |
| w.tm2BootAsync | Boolean | | If true, this container will initialize asynchronously |
| w.tmPageId | Number | | The unique id for the base container |
| w.tmParam | Object | None | Parameters to be passed into tags |
| host | String | gslb.tagman.com | URL associated with this container, e.g. pfa.levexis.com |
| cdn | String | — | Required. This specifies the domain used. Container code selects the appropriate server for secure or non-secure calls. |
| account | String | — | Required. The name of the client schema for this container |
| waitService | String | — | Required. Domain for the TagMan wait service. Do not alter. |
| waitTest | Boolean | — | Triggers an initial test of the waitService which provides insurance of proper functioning when necessary during the tag loading process. |
| version (conf.version) | String | — | Container Version. Should be '3' for TagMan 3. This string is used to create the TagMan call URL. |
| async | Boolean | false | TagMan 3 allows many previously synchronous tags to be run asynchronously. When set to true, this loads the TagMan container asynchronously and alerts the container to presume that all tags in this container can be loaded asynchronously. Note: Synchronous tags may still function if async = true. |
| tagsBlockingTimeout | Number | 0 | Not yet available. Number in milliseconds. When the cumulative blocking time taken by tags during load/insertion exceeds this number (IE the amount of time the page waits for blocking tags to finish executing), terminate loading further tags. This works across all TagMan instances. |
| sessionTimeout | Number | 1800 | Defines the number of seconds in a "session," used as the timeout for landing page rules. |
| storageType | String | local | Not yet available. Type of storage to use for storing system data such as session time out, click history etc. This can be either local or cookie. When cookie is selected, then first party cookies are used. |
| landingPageContainer | Boolean | false | True if container should only be loaded when the session has timed out/sessionTimeout (seconds) or landingPageMins have elapsed. |
| bootstrap | Boolean | true | When true, container is initialized immediately, assuming the sessionTimeout criteria is met |
| enableJSCall | Boolean | true | When false the JavaScript call is omitted. This should only be set to false if all tags for container are to be delivered via IFrame |
| tags | Array | empty | Tags associated with this container |

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention.

I claim:

1. A method for managing a plurality of tags in a web page using a tag container, the method comprising:
   transmitting, by a browser executing on a computing device, a request for the web page to a web server;
   receiving, by the browser, the web page comprising the tag container, the tag container comprising a configuration component, a template component, and a rules component, the template component comprising a first template for dynamically generating a first tag that gathers first analytics data and a second template for dynamically generating a second tag that gathers second analytics data;
   in response to receiving the web page, executing, by the browser, the tag container to obtain a first value and a second value;
   in response to executing the tag container, applying the configuration component to assign the first value to a first parameter of a first instance of the first template to dynamically generate the first tag and to assign the second value to a second parameter of an instance of the second template to dynamically generate the second tag;
   applying the configuration component to assign a third value to a third parameter of a second instance of the first template to dynamically generate a third tag that gathers third analytics data;
   applying the rules component to modify at least one property of the first tag to control if, how, or when the first tag is loaded on the web page;
   loading, by the browser, the first tag in accordance with the at least one property; and
   determining not to load a fourth tag based on a geographical location associated with the browser, information about a user of the browser, or a time at which the request for the web page is made.

2. The method of claim 1, wherein the tag container obtains the first value and the second value from a server that is remote from the computing device.

3. The method of claim 1, further comprising determining to generate the first tag based on a geographical location associated with the browser, information about a user of the browser, or a time at which the request for the web page is made.

4. The method of claim 1, further comprising identifying, based on a function to be performed by the first tag, the first template for generating the first tag.

5. The method of claim 1, wherein the first parameter specifies a location of the first tag in the web page, synchronous or asynchronous loading of the first tag, user-specific information, domain or web page information, campaign information, account information, identification of the first tag, or session information.

6. The method of claim 1, wherein the applying the rules component comprises implementing a business rule created by a vendor that created the first tag.

7. The method of claim 1, wherein the loading the first tag comprises writing the first tag into an iframe within the web page.

8. The method of claim 1, further comprising determining, using the tag container, a sequence for loading the first tag and the second tag.

9. A system for managing a plurality of tags in a web page using a tag container, the system comprising:
   a network interface;
   memory; and
   at least one processor configured to execute computer-executable instructions stored in the memory to cause a computing device to:
     transmit, via the network interface, a request for the web page to a web server;
     receive, via the network interface, the web page comprising the tag container, the tag container comprising a configuration component, a template component, and a rules component, the template component comprising a first template for dynamically generating a first tag that gathers first analytics data and a second template for dynamically generating a second tag that gathers second analytics data;
     in response to receiving the web page, execute the tag container to obtain a first value and a second value;
     in response to executing the tag container, apply the configuration component to assign the first value to a first parameter of a first instance of the first template to dynamically generate the first tag and to assign the second value to a second parameter of an instance of the second template to dynamically generate the second tag;
     apply the configuration component to assign a third value to a third parameter of a second instance of the first template to dynamically generate a third tag that gathers third analytics data;
     apply the rules component to modify at least one property of the first tag to control if, how, or when the first tag is loaded on the web page;
     load the first tag in accordance with the at least one property; and
     determine not to load a fourth tag based on a geographical location associated with the computing device, information about a user of the computing device, or a time at which the request for the web page is made.

10. The system of claim 9, wherein the at least one processor is further configured to cause the computing device to determine to generate the first tag based on a geographical location associated with the computing device, information about a user of the computing device, or a time at which the request for the web page is transmitted.

11. The system of claim 9, wherein the at least one processor is further configured to cause the computing device to select, using the template component and based on information identifying the first tag, the first template from among a plurality of templates.

12. The system of claim 9,
wherein the at least one processor is further configured to cause the computing device to apply the rules component to modify at least one property of the second tag to control if, how, or when the second tag is loaded on the web page, and
wherein the at least one property of the first tag and the at least one property of the second tag control a sequence for loading the first tag and the second tag.

13. The method of claim 1, further comprising identifying, based on a vendor that created the first tag, the first template for generating the first tag.

14. The method of claim 1, further comprising identifying, based on an identifier indicating a client that provides the web page, the first template for generating the first tag.

15. One or more non-transitory computer readable storage media storing computer-executable instructions that, when executed by at least one processor, cause a computing device to:
transmit, via a network interface of the computing device, a request for a web page to a web server;
receive, via the network interface, the web page comprising a tag container, the tag container comprising a configuration component, a template component, and a rules component, the template component comprising a first template for dynamically generating a first tag that gathers first analytics data and a second template for dynamically generating a second tag that gathers second analytics data;
in response to receiving the web page, execute the tag container to obtain a first value and a second value;
in response to executing the tag container, apply the configuration component to assign the first value to a first parameter of a first instance of the first template to dynamically generate the first tag and to assign the second value to a second parameter of an instance of the second template to dynamically generate the second tag;
apply the configuration component to assign a third value to a third parameter of a second instance of the first template to dynamically generate a third tag that gathers third analytics data;
apply the rules component to modify at least one property of the first tag to control if, how, or when the first tag is loaded on the web page;
load the first tag in accordance with the at least one property; and
determine not to load a fourth tag based on a geographical location associated with the computing device, information about a user of the computing device, or a time at which the request for the web page is made.

16. The one or more non-transitory computer readable storage media of claim 15, wherein the tag container comprises a parameter that controls a position within the web page at which the tag container loads.

17. The one or more non-transitory computer readable storage media of claim 15, wherein the tag container comprises an empty array for subsequently storing the first tag and the second tag.

18. The one or more non-transitory computer readable storage media of claim 15,
wherein the tag container comprises a parameter that indicates a blocking time, and
wherein the at least one processor further causes the computing device to terminate loading of the second tag upon determining that a time taken by the second tag to load exceeds the blocking time.

19. The one or more non-transitory computer readable storage media of claim 15, wherein the first template corresponds to a first vendor and the second template corresponds to a second vendor different from the first vendor.

20. The one or more non-transitory computer readable storage media of claim 15, wherein the at least one property specifies a position within the web page at which the first tag loads.

* * * * *